United States Patent

[11] 3,551,663

[72] Inventors Edwin W. Herron
Scottsdale, Ariz.;
Robert D. Hunter, Wayland, Mass.; David E. Keefer, Scottsdale, Ariz.

[21] Appl. No. 448,538
[22] Filed Apr. 15, 1965
[45] Patented Dec. 29, 1970
[73] Assignee General Electric Company a corporation of New York

[54] MULTIPLICATION APPARATUS IN A DATA PROCESSING SYSTEM WITH A VARIABLE LENGTH MULTIPLIER
5 Claims, 2 Drawing Figs.

[52] U.S. Cl. .......... 235/159, 235/156
[51] Int. Cl. .......... G06f 7/52
[50] Field of Search .......... 235/156, 159, 160, 164, 164

[56] References Cited
UNITED STATES PATENTS

| | | | |
|---|---|---|---|
| 3,192,363 | 6/1965 | MacSorley | 235/164 |
| 3,161,764 | 12/1964 | Croy | 235/160 |
| 3,016,194 | 1/1962 | Bensky et al. | 235/157 |
| 3,159,739 | 12/1964 | Deerfield | 235/164 |

*Primary Examiner*—Malcolm A. Morrison
*Assistant Examiner*—David H. Malzahn
*Attorneys*—George V. Eltgroth, Howard M. Dustin, Ronald W. O'Keefe, Melvin M. Goldenberg, Frank L. Neuhauser and Oscar B. Waddell

ABSTRACT: A data processing system includes multiplication apparatus in which a multiplier decimal character is shifted into a special register and is multiplied by the characters of a multiplicand and a product is formed by accumulatively adding the products of a multiplicand and the characters of a variable length multiplier.

SYSTEM DATA TRANSFER

DATA PROCESSING SYSTEM

INVENTORS.
EDWIN W. HERRON
ROBERT D. HUNTER
DAVID E. KEEFER
BY Ronald W. O'Keefe
ATTORNEY

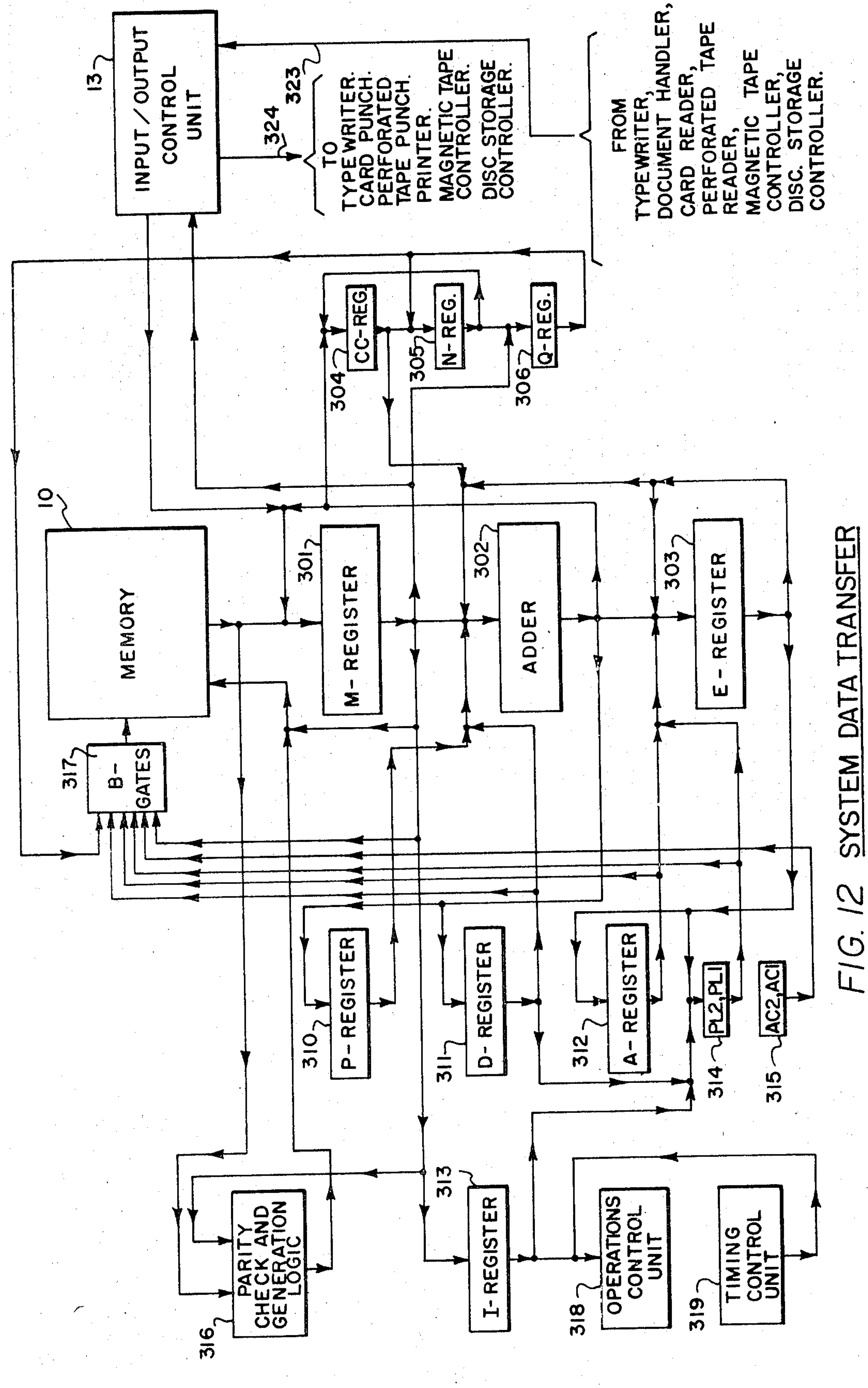
FIG. 12 SYSTEM DATA TRANSFER

MULTIPLICATION APPARATUS IN A DATA PROCESSING SYSTEM WITH A VARIABLE LENGTH MULTIPLIER

This invention relates to data processing systems and, in particular, to multiplication apparatus for developing the product of a multiplicand and a multiplier in data processing system.

Arithmetic operations in a data processing system include the operations of addition, subtraction, multiplication and division. Multiplication is normally accomplished in the arithmetic unit of a data processing by performing a sequence of successive additions and shifts to obtain the product. For example, in decimal multiplication, the multiplicand is normally added to itself, or to the partial product if one exists, a number of times equal to the value of a multiplier character to form a new partial product. This partial product is shifted one character position and the same procedure is automatically repeated for the next multiplier character until the final product of the full multiplicand and full multiplier is formed.

In the arithmetic units of prior art data processing systems, provision is normally made for the development of the product of a multiplicand having a fixed number of characters or binary digits and a multiplier having a fixed number of characters or binary digits. For example, a prior art arithmetic unit may be designed to automatically multiply an eight-character multiplicand by an eight-character multiplier to form a product having up to 16 characters. No provision is made for employing a multiplier having a number of characters less than the fixed number. Although the multiplier may be arranged to have a desired number of characters less than the fixed number with the remaining character positions of the multiplier containing zeros, the arithmetic unit still performs the multiplication operation as if the multiplier contained the fixed number of significant multiplier characters. Such an arrangement is wasteful of time and does not most efficiently employ the capabilities of the data processing system. Accordingly, it is desirable to provide an arithmetic unit for performing multiplication of a multiplicand and a variable length multiplier which permits greater flexibility and more efficiently employs the capabilities of the arithmetic unit.

It is therefore an object of the invention to provide an improved multiplication arrangement in the arithmetic unit of a data processing system.

It is another object of the invention to provide improved multiplication apparatus in a data processing system which more efficiently employs the capabilities of the data processing system.

It is a further object of the invention to provide multiplication apparatus in a data processing system which permits greater flexibility in the selection of multiplier size.

It is a further object of the invention to provide multiplication apparatus in a data processing unit which permits formation of the product of a multiplicand and a selected number of multiplier characters.

The foregoing objects are achieved, in the illustrated embodiment of the invention, by an arrangement in the central processor for shifting the contents of the 16-character accumulator right one character position, in response to a predetermined operation code in the I-Register. The character shifted out of the accumulator is a multiplier character. This multiplier character and an eight-character multiplicand are applied to the arithmetic unit which develops a nine-character product. The nine-character product is stored in the nine most significant character positions of the accumulator. If further development of the product is required, the contents of the accumulator are again shifted right one character position. The product of the multiplicand and the next multiplier character shifted out of the accumulator is added to the product previously stored in the accumulator. This sequence of shifting and multiplying by a single multiplier character is repeated a predetermined number of times to develop the product of the multiplicand and a corresponding number of multiplier characters. If more than eight multiplier characters are to be employed, the portion of the product in the eight least significant character positions of the accumulator may be transferred to other selected memory locations and replaced in the accumulator by additional multiplier characters. Control of the number of repetitions is effected by an instruction word which has associated with it a control word containing a count indicating the number of times that the predetermined operation code is to be inserted into the I-Register.

The application is one of several applications covering an entire computer system. Portions of the apparatus herein disclosed are inventions of the following:

Thomas J. Beatson, David E. Keefer, Richard M. Rojko, and John E. Wilhite, as defined by the claims of their application, Ser. No. 446,067, filed Apr. 6, 1965, now U.S. Pat. No. 3,368,204, issued Feb. 6, 1968;

Thomas J. Beatson, Frank J. Boyle, Byron F. Burch, Jr., Robert D. Hunter, and Daniel W. Scott, as defined by the claims of their application, Ser. No. 448,194, filed Apr. 14, 1965, now U.S. Pat. No. 3,366,932, issued Jan. 30, 1968;

Richard A. Boennighausen and Byron F. Burch, Jr., Ser. No. 448,195, filed Apr. 14, 1965, now U.S. Pat. No. 3,487,368, issued Dec. 30, 1969;

Robert D. Hunter, Robert A. Perrine, and John E. Wilhite, as defined by the claims of their application, Ser. No. 448,196, filed Apr. 14, 1965, now U.S. Pat. No. 3,368,205, issued Feb. 6, 1968;

Edwin W. Herron, Robert D. Hunter, and John E. Wilhite, as defined by the claims of their application, Ser. No. 448,197, filed Apr. 14, 1965, now U.S. Pat. No. 3,368,206, issued Feb. 6, 1968;

Frank J. Boyle and John E. Wilhite, as defined by the claims of their application, Ser. No. 448,537, filed Apr. 15, 1965, now U.S. Pat. No. 3,413,609, issued Nov. 26, 1968;

Edwin W. Herron, Robert D. Hunter, and David E. Keefer, as defined by the claims of their application, Ser. No. 448,539, filed Apr. 15, 1965;

Robert D. Hunter, David E. Keefer, and John E. Wilhite, as defined by the claims of their application, Ser. No. 448,540, filed Apr. 15, 1965, now U.S. Pat. No. 3,483,519, issued Dec. 9, 1969; and David E. Keefer, as defined by the claims of his application, Ser. No. 448,541, filed Apr. 15, 1965, now U.S. Pat. No. 3,370,275, issued Feb. 20, 1968. All of the above applications are assigned to the assignee of the present application.

DESCRIPTION OF DRAWINGS

The subject matter of the invention is particularly pointed out and distinctly claimed in the concluding portion of the specification. The invention, however, both as to organization and method of operation may best be understood by reference to the following description taken in connection with the accompanying drawings, in which:

FIG. 12 is a block diagram of the data storage elements, the data transfer paths between these elements and the major control elements of the data processing system of FIG. 1.

Figure 1:
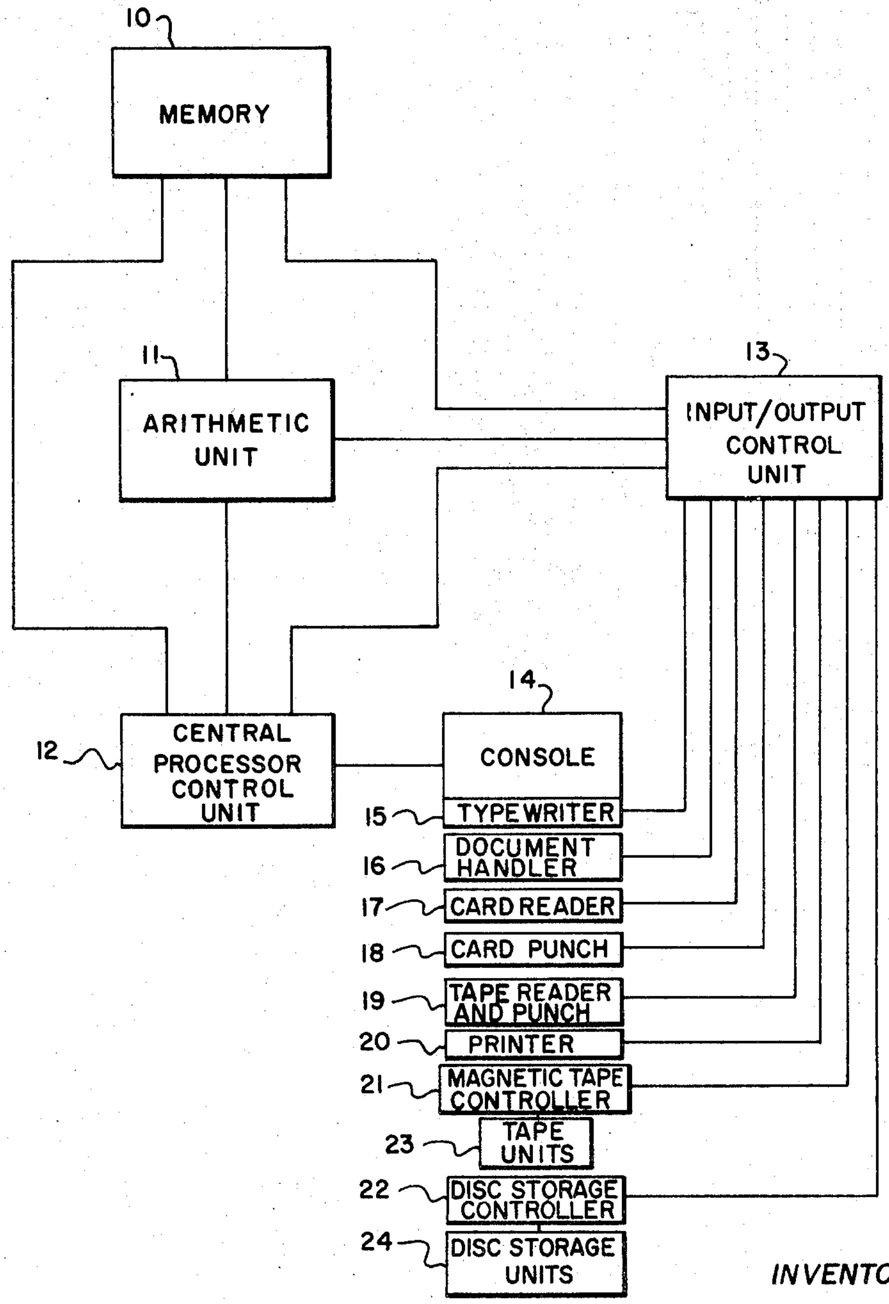
FIG. 1 is a block diagram of the data processing system to which the instant invention is applicable.

It will be noted that the figures are numbered to correspond to the numbering of the figures of the Hunter et al. U.S. Pat. No. 3,368,205, referenced below.

DATA PROCESSING SYSTEM - GENERAL

With reference to FIG. 1, the illustrated data processing system comprises a Central Processor and a plurality of peripheral subsystems. The major units of the Central Processor are Memory 10, Arithmetic Unit 11, Central Processor Control Unit 12, Input/Output Control Unit 13 and Console 14. In the description, the term Program Processor is applied to the portion of the Central Processor consisting of the Arithmetic Unit 11, the Central Processor Control Unit 12 and the Console 14. The peripheral subsystems which are used with the Central Processor to process data include Typewriter 15 which is associated with Console 14, Document Handler 16, Card Reader 17, Card Punch 18, Perforated Tape Reader/Punch Unit 19, Printer 20, Magnetic Tape Controller 21 and Disc Storage Controller 22. Magnetic Tape Controller 21 can control a plurality of Magnetic Tape Units 23 and Disc Storage Controller 22 can control a plurality of Disc Storage Units 24. Any combination of these peripheral subsystems may be employed with the Central Processor to perform a desired data processing function. The lines interconnecting the various components illustrated in FIG. 1 represent symbolically paths of data and control signals.

The Central Processor responds to a plurality of distinct instructions which are supplied in the sequential order necessary to perform a particular data processing operation. Memory 10 stores data words which are to be processed, data words which are the result of processing, instruction words and auxiliary words for addressing and control. The Accumulator of the Central Processor is also located in Memory 10.

Arithmetic Unit 11 performs binary and decimal arithmetic operations. Central Processor Control Unit 12 controls the sequence of events required for instruction execution in the Central Processor. Arithmetic Unit 11 and Central Processor Control Unit 12, which together comprise the Program Processor, contain the logical elements necessary to access Memory 10 and to perform all operations required for instruction execution. Arithmetic Unit 11 and Central Processor Control Unit 12 communicate with Memory 10 to obtain instruction words, auxiliary words, data words on which operations are to be performed and control signals for synchronizing the Program Processor timing with operations in Memory 10.

Input/Output Control Unit 13 provides for orderly sequencing of data transfers between Memory 10 and the plurality of peripheral subsystems and serves to transmit instructions from the Central Processor to the peripheral subsystems. The Input/Output Control Unit also monitors peripheral subsystem operating conditions. Communication between the Central Processor and the various peripheral subsystems occurs through a plurality of channels which are included in the Input/Output Control Unit 13, each channel being associated with one peripheral subsystem.

Console 14, in conjunction with Typewriter 15, permits operator control and communication with the Central Processor. The Console includes switches for controlling Central Processor power and program loading, for initiating and halting Central Processor operation and for resetting alert conditions.

For a complete description of the system of FIG. 1 and of the present invention which is embodied in such system, U.S. Pat. No. 3,368,205, Hunter et al. issued Feb. 6, 1968, and assigned to the assignee of the present invention is hereby incorporated by reference herein and made part of the instant application. More particularly, FIG. 159 of the drawings and column 187, beginning with "Instruction 27: Variable Length Multiply (VLM)" at about line 44, columns 188—196, and the top part of columns 197 and 198, comprising part of an illustration, are referred to specifically as being pertinent to the invention claimed herein.

We claim:

1. In a data processing system, apparatus for performing a decimal multiply algorithm by multiplying a first decimal number representing a multiplicand by a second decimal number representing a multiplier, whereby the multiplicand is added to itself a number of times equal to the value of the number represented by said multiplier to sequentially form and accumulate a partial product and to form a third decimal number representative of a final product, the combination comprising:

a. a first storage means for storing said multiplicand;
b. a second storage means
   1. for storing at least a portion of said multiplier during first and second time periods,
   2. for sequentially storing said partial product during said second time period, and
   for storing said final product during a third time period;
c. a third storage means connected to said first and said second storage means
   1. for storing said multiplier during said first time period,
   2. for sequentially storing said multiplicand and said partial product respectively during said second time period;
d. a fourth storage means for sequentially storing said multiplier and said partial product respectively during said second time period;
e. shifting means for sequentially shifting said third and fourth storage means 1. 1. a portion of said multiplier shifting from said fourth storage means into said third storage means during said first time period, and
   1. a portion of said partial product shifting from said fourth storage means into said third storage means during said second time period;
f. adder means in communication with said third and fourth storage means
   1. for sequentially transferring said multiplier and said partial product to said fourth storage means during said second time period, and
   2. for sequentially adding said multiplicand to itself a predetermined number of times during said second time period;
g. a first control means
   1. for receiving signals from said adder means representative of a multiplier character during said first time period,
   2. for receiving carry signals representative of partial product carries during said second time period,
   3. said control means providing signals to said adder means during said second time period representative of a portion of said partial product, and
   4. said control means generating a terminate signal during said second time period representative of a number of successive additions of the multiplicand to itself equal in number to a portion of said multiplier contained in said first control means;
h. second control means for generating output signals representative of said first, second, and third time periods, said second control means responsive to said terminate signal from said first control means and to a control signal, whereby said second control means generates a signal representative of said third time period when said second control means is generating a signal representative of said second time period; and
i. third control means
   1. for temporarily retaining a number representative of a plurality of multiplier characters to be used to develop said final product, said third control means responsive to said terminate signal whereby said number is counted by the application of said terminate signal to said third control means, and
   2. for generating said control signal when the number of said multiplier characters, as specified by said number in said third control means, has been used.

2. The apparatus of claim 1 in which the third storage means includes transfer means for sequentially transferring said multiplier between the second storage means and the third storage means during the first time period.

3. The apparatus of claim 2 in which the transfer means includes means for sequentially transferring said partial product between said second and third storage means during the second time period.

4. The apparatus of claim 3 which includes means for sequentially transferring the multiplicand between said first and third storage means during said second time period.

5. The apparatus of claim 4 which includes means for transferring the final product from said third storage means to said second storage means during the second time period.